Aug. 1, 1967  G. TRIBUZI  3,333,652

OIL-CATCHING APRON FOR VEHICLES

Filed April 6, 1965

INVENTOR.
GINO TRIBUZI
BY Joseph F. Cole
ATTORNEY

United States Patent Office 3,333,652
Patented Aug. 1, 1967

3,333,652
OIL-CATCHING APRON FOR VEHICLES
Gino Tribuzi, 1758 Kelly St., San Mateo, Calif. 94403
Filed Apr. 6, 1965, Ser. No. 446,048
3 Claims. (Cl. 180—69.1)

ABSTRACT OF THE DISCLOSURE

An oil-catching apron positionable under a vehicle engine and transmission, and having a flexible foundation sheet provided on its upper surface with an absorbent pad located to absorb oil dripping from the engine and transmission. Flexible marginal side and end flaps of the foundation sheet are provided with resilient means anchorable to selected parts of the vehicle above the pad so that the latter will be drawn into a pan-shaped configuration.

---

The present invention relates to improvements in an oil-catching apron for vehicles. It consists of the combinations, constructions, and arrangements of parts, as hereinafter described and claimed.

It is a well known fact that oil will drip from automobiles and trucks onto the garage floor, driveway and other places where these vehicles may be parked. While resort has been made to the use of oil pans for use in garages, the accumulated oil presents a rather unsightly appearance and often the oil is tracked about by individuals stepping accidentally into the oil pan.

Accordingly, it is proposed in this invention to provide an oil-catching apron that may be readily attached to the underneath parts of the vehicle so as to present an apron under the engine and transmission that will absorb the dripping oil. This apron is designed to remain in place under the vehicle for extended periods of time.

More specifically stated, it is proposed to provide an oil-catching apron having a relative large foundation sheet adapted to be supported under a vehicle engine and transmission, this foundation having an absorbent pad covering an area at least equal to the combined bottom area of the vehicle engine and transmission, and being secured to the upper surface of the foundation sheet in a position to absorb dripping oil.

Another object of the invention is to reinforce the foundation sheet with rods that may be bent into predetermined shapes so as to hold the foundation sheet and absorbent pad out of contact with selected parts of the vehicle, for instance, the hot exhaust pipe. However, these rods are so arranged that the apron may be rolled into a compact unit for shipment and storage purposes.

A still further object of the invention is to provide a novel structure for mounting the oil-catching apron in place under the vehicle engine and transmission, which will stretch the foundation sheet taut and prevent it from whipping or tending to be displaced, even when the vehicle is travelling at a relative high speed.

Other objects and advantages will appear as the specification proceeds, and the novel features of the invention will be pointed out in the appended claims.

Drawing

For a better understanding of the invention, reference should be had to the accompanying drawing, forming part of this specification, in which.

Figure 1:
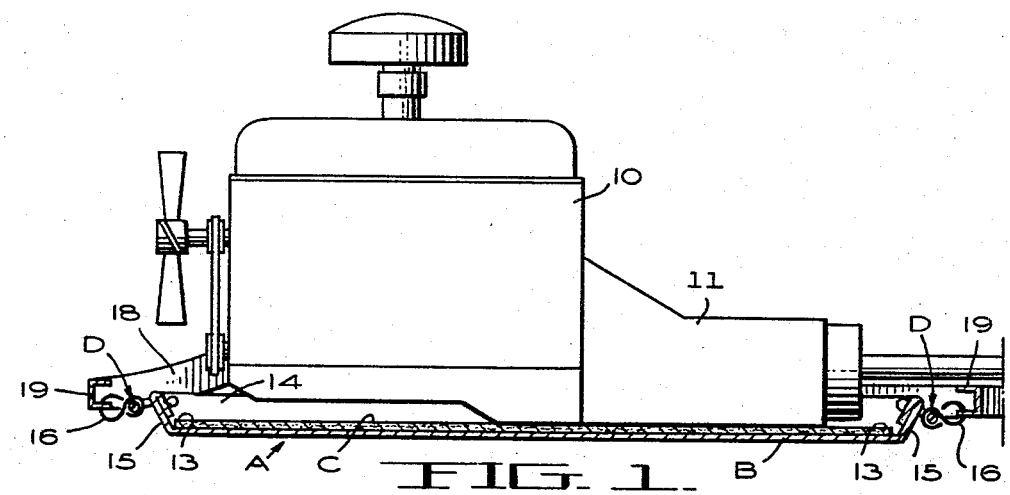
FIG. 1 is side elevational view of a vehicle engine and transmission, with my oil-catching apron mounted therebeneath, the apron being shown in longitudinal section.

While I have shown only the preferred embodiments of my invention, it should be understood that various changes, or modifications, may be made within the scope of the appended claims without departing from the scope thereof.

Detailed description

Referring now to the drawing in detail, I have shown a vehicle engine 10 and transmission 11, both of which are apt to have oil drip therefrom. My oil-catching apron is designated generally at A in FIGS. 1 to 3, inclusive.

It will be noted that the apron A has a relatively large foundation sheet B made of suitable material, such as canvas, plastic, fabric, and being flexible in character. This foundation sheet is adapted to be positioned under the vehicle engine 10 and the transmission 11, as shown in FIG. 1 of the drawing. This foundation sheet is substantially rectangular in outline (see FIG. 2).

Moreover, a flexible substantially rectangular absorbent pad C covering an area at least equal to the combined bottom area of the vehicle engine and transmission is secured by stitching 12 to the upper surface of the foundation sheet B in a position to absorb oil dripping from the engine and transmission. This pad may be made from felt.

In its structural features, the foundation sheet B extends beyond the marginal edges 13 of the absorbent pad C, both laterally and longitudinally, with the foundation sheet defining flexible marginal side and end flaps 14 and 15, respectively, which project beyond the absorbent pad and are foldable upwardly relative to the latter, as shown in FIG. 1.

For the purpose of supporting the foundation sheet A and absorbent pad C in place, a looped elastic cord D and hooks 16 are used. It will be observed that a plurality of eyelets 17 are attached to the side and end flaps 14 and 15, respectively, of the foundation sheet, with these eyelets being disposed at intervals around the perimeter of the foundation sheet and adjacent eyelets being spaced from one another.

Figure 2:
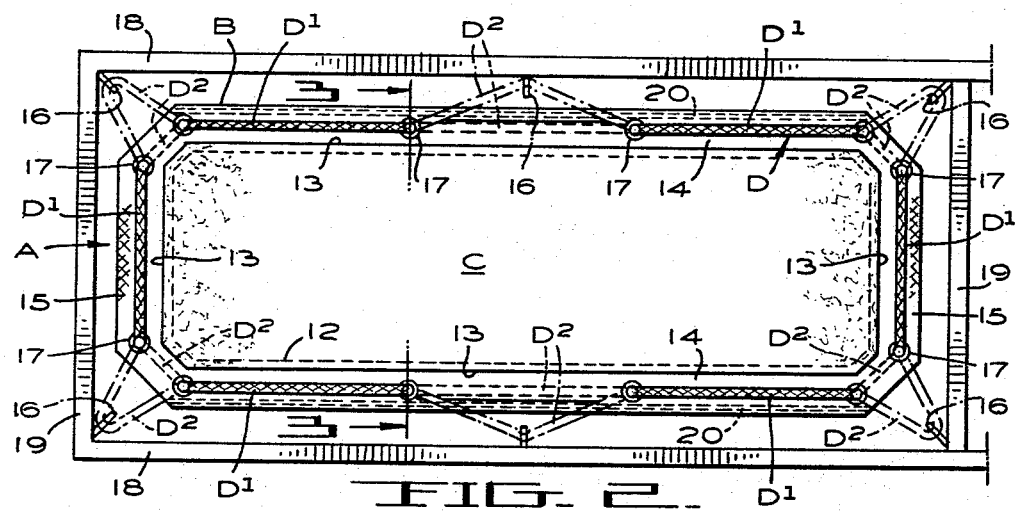
FIG. 2 is a top plan view of the oil-catching apron, the dot-dash lines illustrating stretched positions of a looped elastic cord for attaching the apron to the vehicle frame.

The looped elastic cord D is threaded through the eyelets 17 in succession, and defining loop segments $D^1$ and $D^2$ disposed on the upper and lower surfaces, respectively, of the foundation sheet (see FIG. 2). The hooks 16 previously mentioned are preferably S-shaped (see FIG. 1) and are made for engaging with selected parts of the vehicle, such as longitudinal frame members 18 and transverse frame members 19 of the chassis, when the loop segments are stretched.

It will be observed from FIG. 2 that the hooks 16 have been disclosed as being confined to the loop segments $D^2$ that are arranged on the lower surface of the foundation sheet B, whereby the flexible marginal side and end flaps 14 and 15, respectively, will be yieldingly drawn upwardly relative to the pad C, providing a pan-shaped configuration, as shown in FIG. 1, when these lower surface loop segments are stretched and the hooks are engaged with parts of the vehicle disposed at elevations above the foundation sheet. This arrangement will serve to prevent excess oil from being blown from the pad and dust from gaining access to the pad, when the vehicle is advanced.

Figure 3:
FIG. 3 is an enlarged transverse sectional view taken along the line 3—3 of FIG. 2.

As shown in FIGS. 2 and 3, reinforcing rods 20 are carried in hems 21 of the foundation sheet B, and these rods are bendable into predetermined shapes so as to hold the foundation sheet and absorbent pad out of contact with selected parts of the vehicle, for instance, a hot exhaust pipe of the engine 10.

The rods 20 are confined to the marginal side flaps 14 of the foundation sheet B to extend longitudinally of the latter, whereby the foundation sheet and the absorbent pad may be rolled as a unit about their lengths. This will provide a compact apron for storing and shipping purposes.

Figure 4:
FIG. 4 is a view similar to FIG. 3, but disclosing a modified embodiment of the oil-catching apron.

The modified form of the oil-catching apron $A^1$ shown in FIG. 4 is very similar to the apron A previously described, and like reference characters have been applied to corresponding parts. However, the modified apron has a layer of fire-resistant material 22, such as glass wool or fiberglass, covering the absorbent pad C. The dripping oil will pass downwardly through this material 22 and enter the pad C, but the layer 22 will heat-insulate the pad against being burned by a hot exhaust pipe.

I claim:
1. In an oil-catching apron for vehicles:
   (a) a flexible substantially rectangular foundation sheet positionable under a vehicle engine and transmission;
   (b) a flexible substantially rectangular absorbent pad covering an area at least equal to the combined bottom area of the vehicle engine and transmission, and being secured to an upper surface of the foundation sheet in a position to absorb oil dripping from the engine and transmission;
   (c) the foundation sheet extending beyond marginal edges of the absorbent pad, both laterally and longitudinally, with the foundation sheet defining flexible marginal side and end flaps which project beyond the absorbent pad and are foldable upwardly relative to the latter;
   (d) and resilient means secured to the flexible side and end flaps of the foundation sheet, and having means made to be anchored to selected parts of the vehicle to draw the foundation sheet taut and to support the latter.

2. The oil-catching apron for vehicles, as set forth in claim 1;
   (e) and in which reinforcing rods are carried by the foundation sheet, and these rods being bendable into predetermined shapes so as to hold the foundation sheet and absorbent pad out of contact with selected parts of the vehicle;
   (f) the reinforcing rods being confined to the marginal side flaps of the foundation sheet to extend longitudinally of the latter, whereby the foundation sheet and the absorbent pad may be rolled as a unit about their lengths.

3. In an oil-catching apron for vehicles:
   (a) a flexible substantially rectangular foundation sheet positionable under a vehicle engine and transmission;
   (b) a flexible substantially rectangular absorbent pad covering an area at least equal to the combined bottom area of the vehicle engine and transmission, and being secured to an upper surface of the foundation sheet in a position to absorb oil dripping from the engine and transmission;
   (c) the foundation sheet extending beyond marginal edges of the absorbent pad, both laterally and longitudinally, with the foundation sheet defining flexible marginal side and end flaps which project beyond the absorbent pad and are foldable upwardly relative to the latter;
   (d) a plurality of eyelets attached to the flexible side and end flaps of the foundation sheet, with these eyelets being disposed at intervals around the perimeter of the foundation sheet and adjacent eyelets being spaced from one another;
   (e) a looped elastic cord threaded through these eyelets in succession, and defining resilient loop segments alternately disposed on upper and lower surfaces of the foundation sheet;
   (f) and a plurality of hooks connected to selected loop segments located on the lower surface of the foundation sheet, whereby the flexible marginal side and end flaps will be yieldingly drawn upwardly relative to the absorbent pad, providing a pan-shaped configuration, when these lower surface loop segments are stretched and the hooks are engaged with parts of the vehicle disposed at elevations above the foundation sheet, thereby preventing excess oil from being blown from the pad and dust gaining access to the pad when the vehicle is advanced.

References Cited
UNITED STATES PATENTS

| | | | |
|---|---|---|---|
| 1,163,317 | 12/1915 | Brush | 180—69.1 |
| 2,732,024 | 1/1956 | Schonwald | 180—69.1 |
| 2,783,848 | 3/1957 | Beskid | 184—106 X |
| 3,184,764 | 5/1965 | West | 4—172 |

LAVERNE D. GEIGER, *Primary Examiner.*

H. S. BELL, *Assistant Examiner.*